(12) United States Patent
Mitchell

(10) Patent No.: US 6,321,904 B1
(45) Date of Patent: Nov. 27, 2001

(54) CONVEYOR BELT WITH LOCKING MEMBER FOR HOLDER ELEMENTS

(76) Inventor: Charles L. Mitchell, 467 Wards Corner Rd., Loveland, OH (US) 45140-9027

( * ) Notice: Subject to any disclaimer, the term of this patent is extended or adjusted under 35 U.S.C. 154(b) by 0 days.

(21) Appl. No.: 09/565,112

(22) Filed: May 4, 2000

(51) Int. Cl.[7] .................................................. B65G 47/84
(52) U.S. Cl. .............................. 198/867.11; 198/867.14; 198/690.2
(58) Field of Search ................................ 198/690.2, 699, 198/867.11, 867.14, 867.15

(56) References Cited

U.S. PATENT DOCUMENTS

| | | | |
|---|---|---|---|
| 991,739 | * | 5/1911 | Morris .................................. 198/699 |
| 1,124,168 | | 1/1915 | Pope . |
| 1,370,663 | | 3/1921 | Moon . |
| 1,723,357 | * | 8/1929 | Koopman .......................... 198/690.2 |
| 2,704,150 | | 3/1955 | Scranton . |
| 2,847,112 | | 8/1958 | Black et al. . |
| 4,143,759 | | 3/1979 | Paradis . |
| 4,316,536 | | 2/1982 | Verbeek . |
| 4,325,478 | * | 4/1982 | Richard ................................ 198/699 |
| 4,678,078 | * | 7/1987 | Hastem-Miller .................. 198/690.2 |
| 4,751,811 | | 6/1988 | Groothuis . |
| 4,832,183 | | 5/1989 | Lapeyre . |
| 4,865,182 | | 9/1989 | Nolte . |
| 4,925,013 | | 5/1990 | Lapeyre . |

OTHER PUBLICATIONS

Breco Flex Catalog, "Polyurethane Timing Belts With Weld–On Profiles"; pp. Front/Back Covers, 4,5,8,9,10,12,16,17, 18,19,32, (1996).
Mectrol Catalog, "Urethane Timing Belts", pp. Cover Page, 14 and 15; (Undated).
QC Industries Inc. Catalog, "New! 300 Series Timing Belt Profiled Conveyor or Applications"; (Undated).
MORSE Conveying Components Emerson Power Transmission Corp. Catalog; pp. Front/Back Covers, 23, 30, 51, 52, 57, 58, 63; (Undated).
Uni–Chains Mfg. Inc. Catalog; "Unichains Conveyor Chains, Belts and Accessories" pp. Front/Back Covers, 42, 56, 61–63, 68, 72, 75, 78; (1997).
Dorner Mfg. Corp. Catalog; "3100 Series Heavy Duty Extruded Alloy Belt Conveyors" pp. Front/Back Covers, 4,10,11 & 12; (Undated).
QC Industries Catalog; "125 Series—The Industry Leader In Modular Conveyor Systems"; pp. Front/Back Covers, 6,7, & 11; (Undated).
Dorner Mfg. Corp. Catalog; "2100 Series—Low Profile Extruded Alloy Belt Conveyors": pp. Front/Back Covers, 1, 12–14 & 23; (1995).
Dorner Mfg. Corp. Catalog; "LPZ—Low Profile Adjustable Angle Conveyors"; pp. Front/Back Covers, 2 & 3; (1996).
IT Equipment Conveyor Catalog "ML–85 Featuring: Mini–Line and Robo–Mate"; pp. Front/Back Covers, 7 & 10; (Undated).

(List continued on next page.)

Primary Examiner—Joseph E. Valenza
(74) Attorney, Agent, or Firm—Dinsmore & Shohl LLP

(57) ABSTRACT

A conveyor apparatus for transporting items via an endless conveyor belt having at least one locking member. At least one interchangeable holder element is adapted to releasably interlock with the locking member provided on the conveyor belt, with the locking member exerting a downward force on the holder element when tension is applied to the belt in use. As a result, the holder element is preloaded against the outer surface of the belt. The preload is at least partially decreased when traveling in an arcuate path about the end pulleys of the conveyor system. Accordingly, the holder elements may easily be removed and replaced without adjusting the tension of the conveyor belt.

27 Claims, 11 Drawing Sheets

OTHER PUBLICATIONS

Geppert–Band GMBH Catalog; pp. Front/Back Covers; Untitled Page; (1994).

Goessling USA Inc. Catalog; Conveying Systems Feed Systems Removal Systems for Press Working Machinery; pp. Front/Back Covers, 2, 3, & 6; (Undated).

Wardcraft Conveyors Catalog: pp. Front/Back Covers, 4,5,7 & 10; (Undated).

Charles Walker & Co. Ltd.; Specification: UT & UA Profiles/Material: White FDA PU; p. 19.3; (Mar. 1995).

Specification: Guiderites—Material: White PU–Molded Groove; Material: White PU and PVC—Solid; Other Guiderite Types; (Unnumbered/Undated).

O. Belt Tracking—Longitudinal Profiles; (Unnumbered/Undated).

Product Range, Technical Data, Arrangement, etc. (contd.); p. 3; (Undated).

Cleats/V–Guides; (Untitled/Unnumbered/Undated).

Rexnord: Attachments for Series 4705 and 4706 Thermoplastic chains; (Unnumbered/Undated).

RAM Belts & Chains—106 Series; p. 9; (Undated).

RAM Belts & Chains—316 Series; p. 17; (Undated).

* cited by examiner

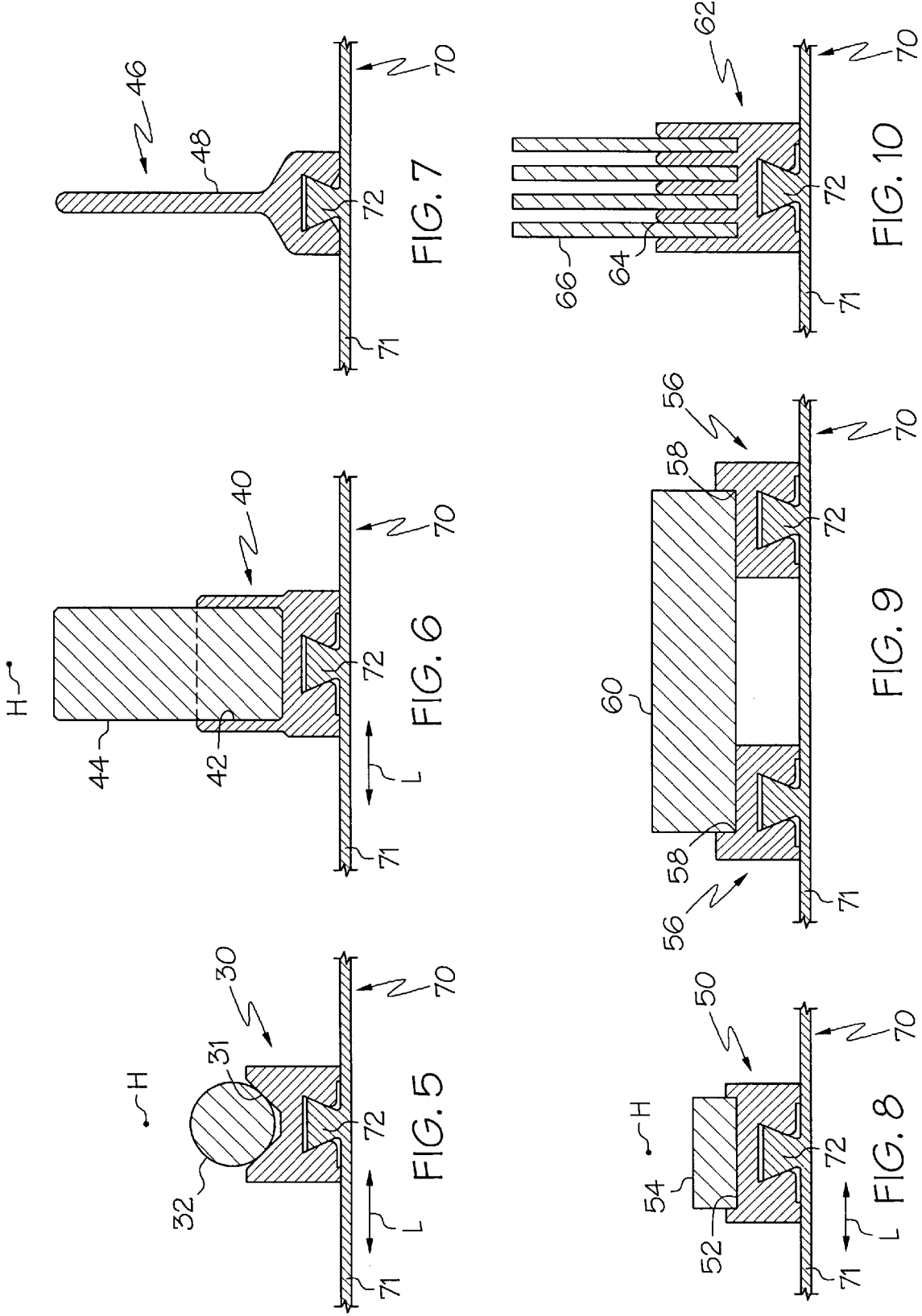

CONVEYOR BELT WITH LOCKING MEMBER FOR HOLDER ELEMENTS

TECHNICAL FIELD

This invention relates generally to a conveyor apparatus having a conveyor belt, and more particularly to a conveyor apparatus having interchangeable holder elements removably interlocked with the conveyor belt.

BACKGROUND OF THE INVENTION

Conveyor belt systems are widely used to transport items in various industrial and automation applications. It is generally known to provide conveyor belts with holder elements for supporting items conveyed by the belt. For instance, numerous suppliers such as Brecoflex Co. have marketed polyurethane timing belts with welded on working profiles. With wide based profile applications, various working profiles are provided on belt systems with reliefs incorporated therein to retain the flexibility in the conveyor belt. Generally, however, the working profiles have been permanently welded to the belt. Thus, in order to change the profile, the entire belt needs to replaced and re-tensioned on the conveyor apparatus. It will be appreciated that welding the working profiles on the belt may be prohibitively expensive since an entire new belt would have to be purchased for each profile application. Moreover, significant downtime would be required to breakdown the conveyor apparatus and replace the belts each time a new application was implemented.

U.S. Pat. No. 4,832,183 to Lapeyre discloses a conveyor belt having insertable and selectable conveying members. For example, Lapeyre describes a conveyor belt which includes a plurality of individual modules joined together by pivot rods. As shown in FIG. 3, a conveying member has an attaching portion for being located within the recess of the module. FIGS. 19A and 19B show another structure for attaching a conveyor member to a base member of the module. As shown and described by Lapeyre, a conveyor member is permanently and securely bonded to a deformable member that is in turn crimped at the edges around the protrusions formed on the module. Lapeyre, however, does not provide an endless conveyor belt formed from a material having bending flexibility, but rather, discloses a plurality of individual modules joined together by pivot rods. Lapeyre apparently required a certain amount of rigidity in its individual modules in order to prevent failure of the joint connections between the conveyor member and the module. The embodiment shown in FIGS. 19A and 19B of Lapeyre also are not particularly adapted for convenient removal from the conveying module once attached. In addition, Lapeyre apparently fails to disclose at least one holder element removably interlocked with a locking member provided on a belt wherein the locking member provides a downward force on the holder element to hold the holder element against the outer surface of the belt.

SUMMARY OF THE INVENTION

Accordingly, it is an object of the present invention to obviate problems and shortcomings of conventional conveyor systems used to transport items from one location to another. More particularly, it is an object of the present invention to provide a conveyor apparatus including removable and/or interchangeable holder elements.

It is a further object of the invention to provide a conveyor apparatus allowing rapid insertion and removal of holder elements without decreasing the tension in the conveyor belt.

It is a further object of the invention to provide a conveyor apparatus that maintains a holder element in a precise position.

It is a further object of the invention to increase the life of a joint connection between a holder element and the conveyor belt.

It is a further object of the invention to provide a conveyor apparatus that minimizes holder element height variations.

It is a further object of the invention to provide an improved conveyor arrangement that facilitates reduced wear on a conveyor belt.

It is a further object of the invention to reduce the manufacturing and replacement costs of a conveyor belt apparatus including holder elements.

It is a further object of the invention to allow an end user to customize a conveyor apparatus by using various combinations of holder elements.

It is a further object of the invention to provide an improved holder element that is maintained in a predetermined position relative to the conveyor belt.

It is a further object of the invention to provide a conveyor system where the holder element can be formed from a nonresilient material.

It is a further object of the invention to provide a removable holder element having a high-strength structural connection to a conveyor belt.

It is a further object of the invention to provide a conveyor apparatus that automatically realigns the holder elements as they travel about the pulleys.

Still other advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 5 is a partial sectional view illustrating one embodiment of a holder element for supporting cylindrical items in a horizontal orientation;

FIG. 6 is a partial sectional view of a holder element including a receptacle for supporting articles in a substantially vertical orientation;

FIG. 7 is a partial sectional view of a holder element in the form of a cleat for supporting articles;

FIG. 8 is a partial sectional view of a holder element for supporting a plate or a bar in a horizontal orientation;

FIG. 9 is a partial sectional view illustrating paired holder elements designed to support an oversized article in a horizontal orientation;

FIG. 10 illustrates a partial sectional view of a holder element for supporting sheet material or planar items in a vertical orientation;

DETAILED DESCRIPTION OF EXEMPLARY EMBODIMENTS

Figure 1:
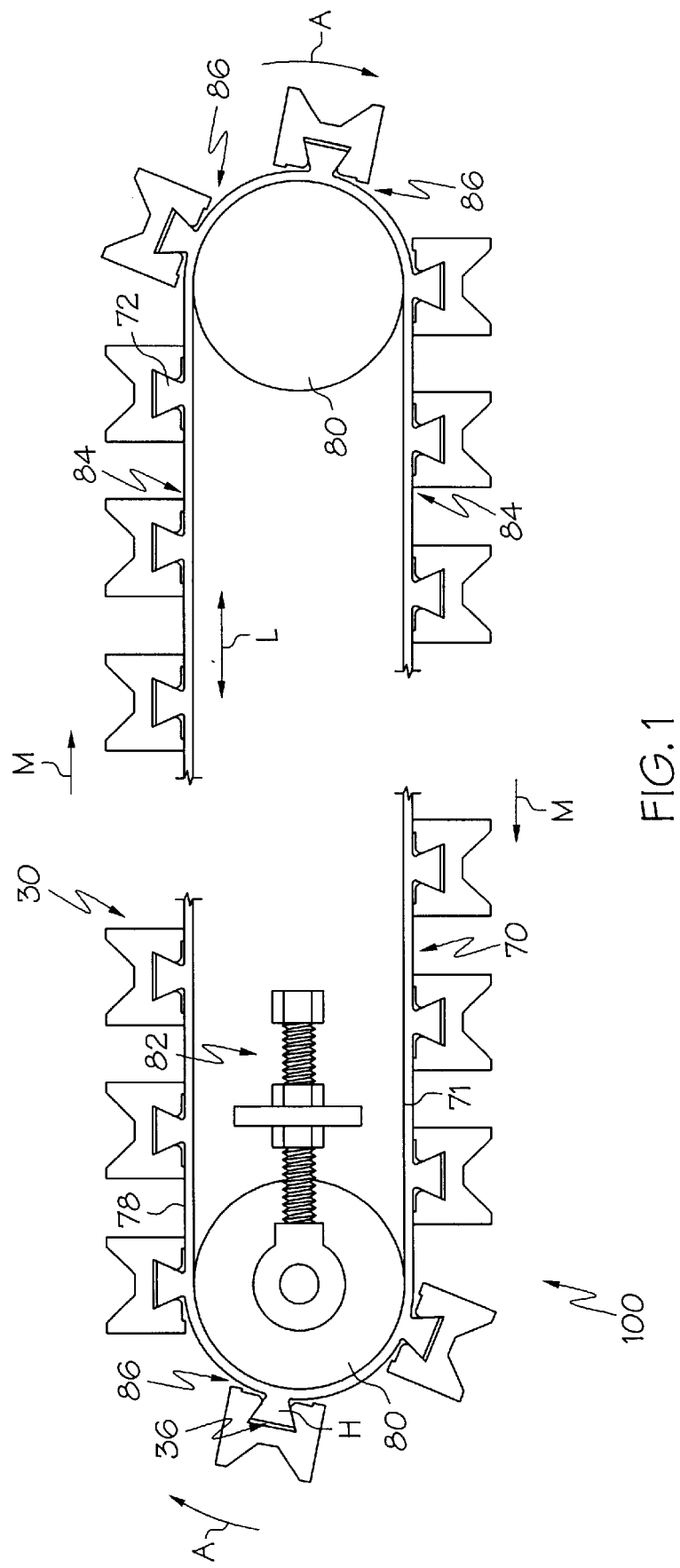
FIG. 1 illustrates portions of a conveyor belt apparatus for use in a conveyor system in accordance with the present invention.

Turning now to the drawing figures, wherein the same element numbers indicate the same or corresponding structures throughout the views, FIG. 1 illustrates portions of an endless conveyor belt apparatus 100 for conveyor applications having end pulleys 80 around which the belt 70 rotates. An endless conveyor belt is defined to include any belt formed in a loop. For instance, the endless conveyor belt could be formed from one continuous (e.g., extruded) piece of flexible material. The endless conveyor belt could also be formed from one piece of flexible material having ends that are mechanically laced, mechanically linked, glued, integrally formed or melted, or otherwise attached to form the endless conveyor belt. The endless conveyor belt could also be formed from a plurality of rigid, flexible, or a composite of rigid and flexible members having the ends attached such that they form one endless loop.

While the apparatus may include additional pulleys, supports and structures along its length, the end pulleys are important as the holder elements and locking members must be designed to move around the ends without difficulties, as will be understood. The belt 70 is provided with one or more holder elements 30 that may be interlocked with one or more locking members 72 of the belt.

Figure 12:
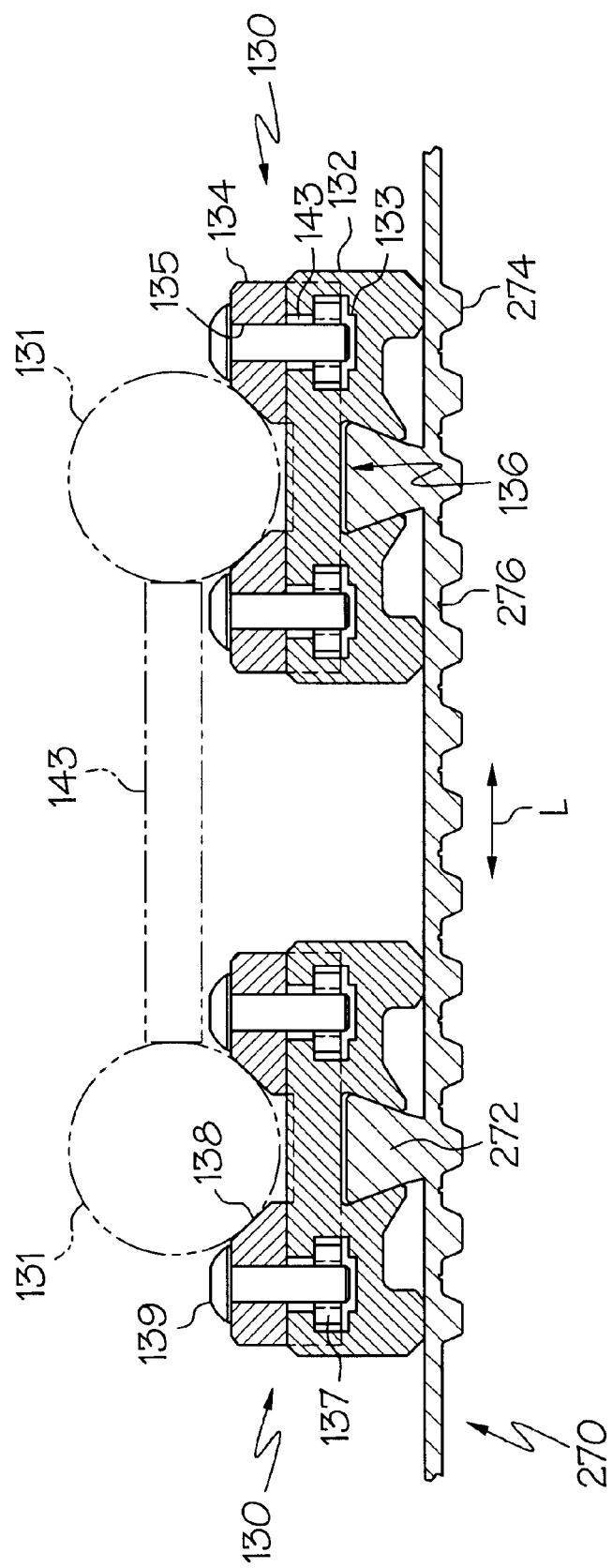
FIG. 12 is a partial sectional view of holder elements like that shown in FIG. 11, including another adjacent holder element.

The locking member 72 may be integrally formed as part of the belt 70. For example, the belt 70 and locking member 72 could be formed simultaneously during an extrusion or injection mold process. Alternatively, a belt 70 could be provided with a locking member 72 that is later welded, glued, riveted, bolted, or otherwise attached to the web portion 71 of the belt 70. For instance, the locking member 72 could be attached to the belt 70 with a high frequency welding process known in the industry. The locking members are appropriately (e.g., equally) spaced along the belt 70. For instance, as shown in FIG. 12, locking members 272 could be spaced along a timing belt 270 having teeth 274, whereby the space between the locking members 272 was determined by a predetermined number of timing belt teeth 274 located between adjacent locking members 272.

Figure 11:
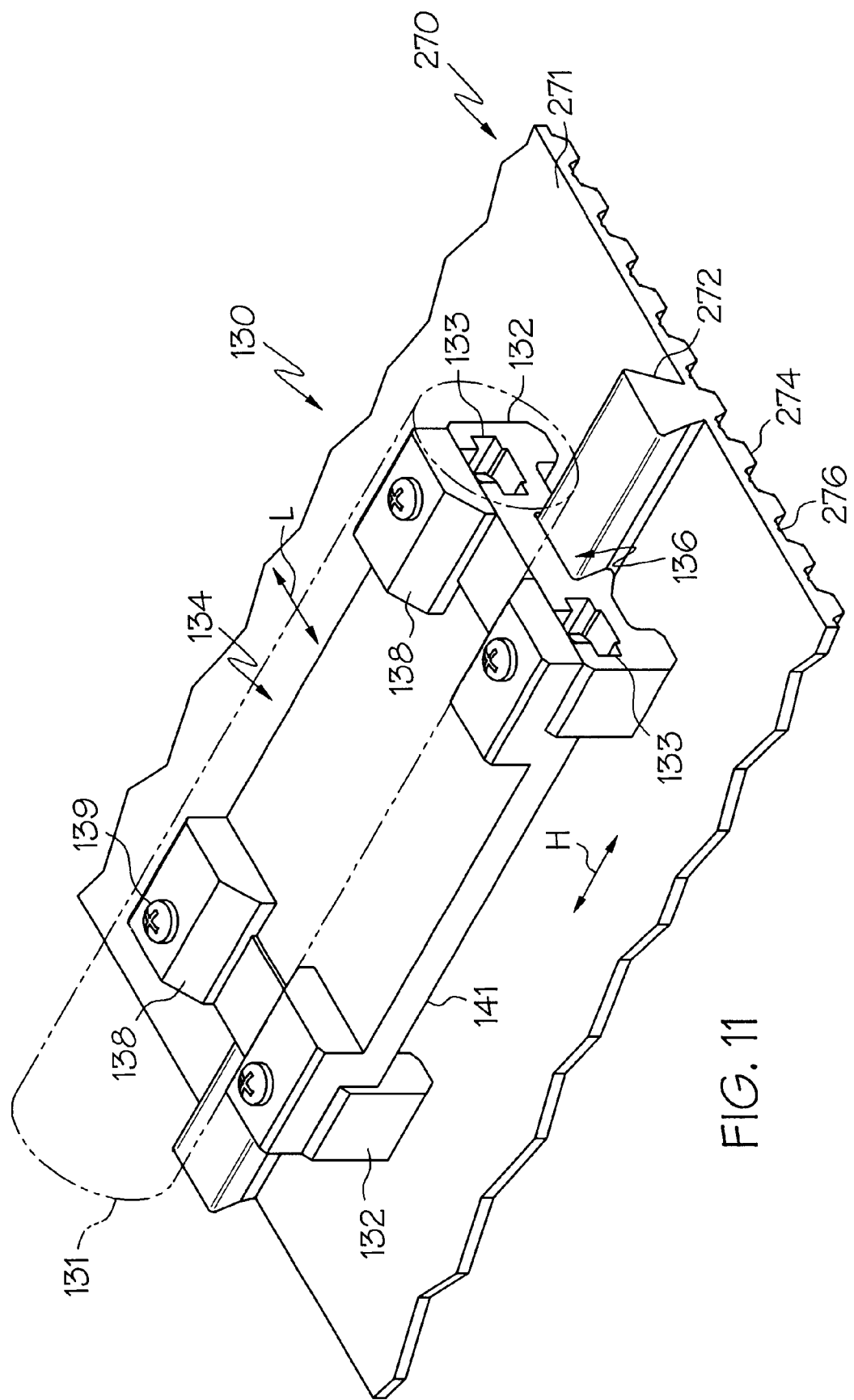
FIG. 11 is a partial perspective view of another holder element of a conveyor belt apparatus of the present invention including a lower portion interlocked with the locking member and an upper portion adjustably positioned relative to the lower portion to allow the item to be adjusted relative to the belt.

The belt 70 may also be placed under tension around the end pulleys 80 and along its longitudinal length or axis (L). In one embodiment, the belt 70 is provided with a tensioner 82, as best illustrated in FIG. 1, for placing the belt 70 under tension. It will be appreciated that the tension in the belt 70 is advantageous in that the tensioned belt 70 may preload the holder element 30 against the outer surface 78 of the belt 70. In one particular embodiment, the holder element 30 is preloaded, in a locked position 84, as it travels along a linear path of movement, best indicated by direction arrows (M) as shown in FIG. 1. Preloading will be further discussed below with respect to FIGS. 2–4. As will be understood, the preload is at least partially decreased, to an at least partially unlocked position 86, when traveling along linear path (M) to the arcuate path (A) along the pulleys, and then increased again to the locked position 84 as it moves from the arcuate path (A) back to the linear path (M) as shown in FIG. 1. Decreasing the preload facilitates attachment and removal of the holder element 30 from the belt 70 without the need for adjusting the tension in the belt 70 with the belt tensioner 82. For example, if a particular holder element 30 needs to be replaced, the belt 70 is rotated about pulleys 80 until the holder element 30 travels from a locked position 84 to an at least partially unlocked position 86. Once located in the at least partially unlocked position 86, the holder element 30 is moved laterally along horizontal axis (H), as best shown in FIGS. 1 and 11, until the locking member 72 is disengaged from the slot 36. Once disengaged, a new holder element may be interlocked with the locking member 72 of the belt 70. The belt 70 is then further rotated such that the new holder element moves from the at least partially unlocked position 86 to a locked position 84.

Figure 2:
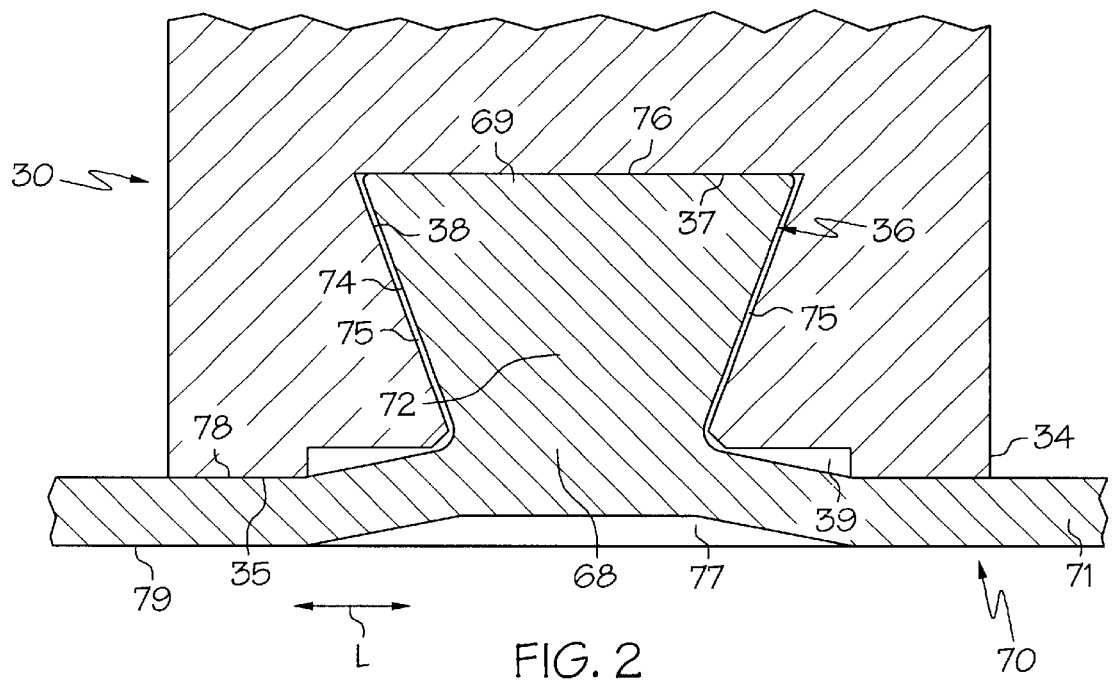
FIG. 2 is a partial sectional view illustrating a locking member of a conveyor belt apparatus being inserted into a slot of the holder element for interlocking the holder element to the belt in accordance with the present invention.
Figure 3:
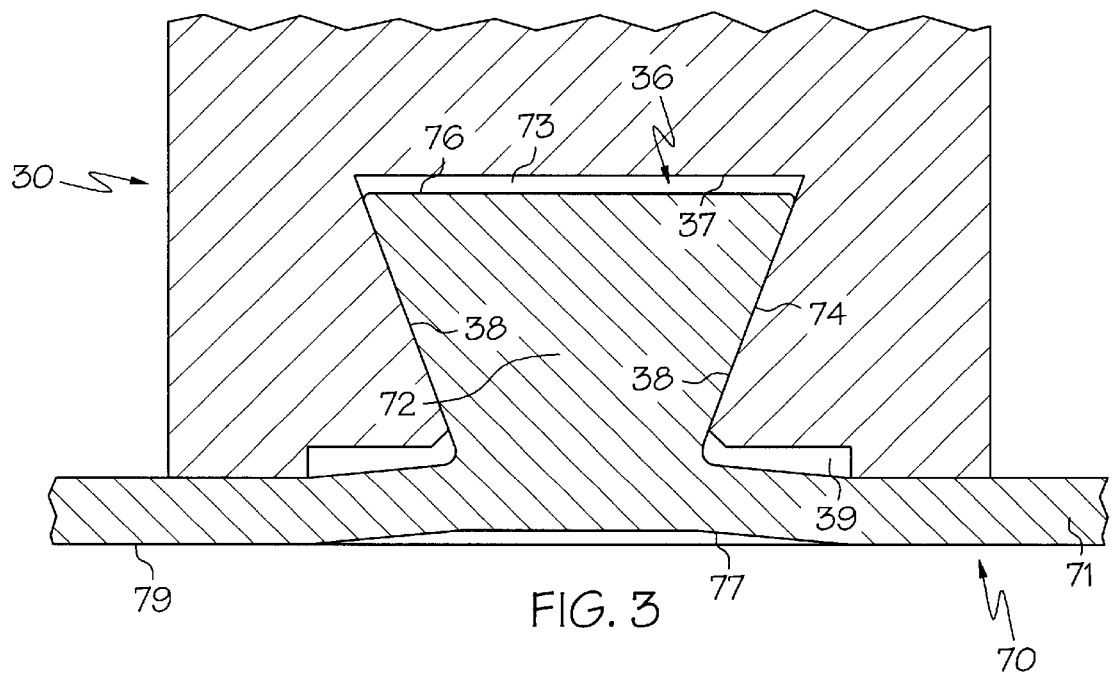
FIG. 3 is a partial sectional view similar to FIG. 2, illustrating the holder element being interlocked with the belt prior to tensioning the belt in accordance with the present invention.
Figure 4:
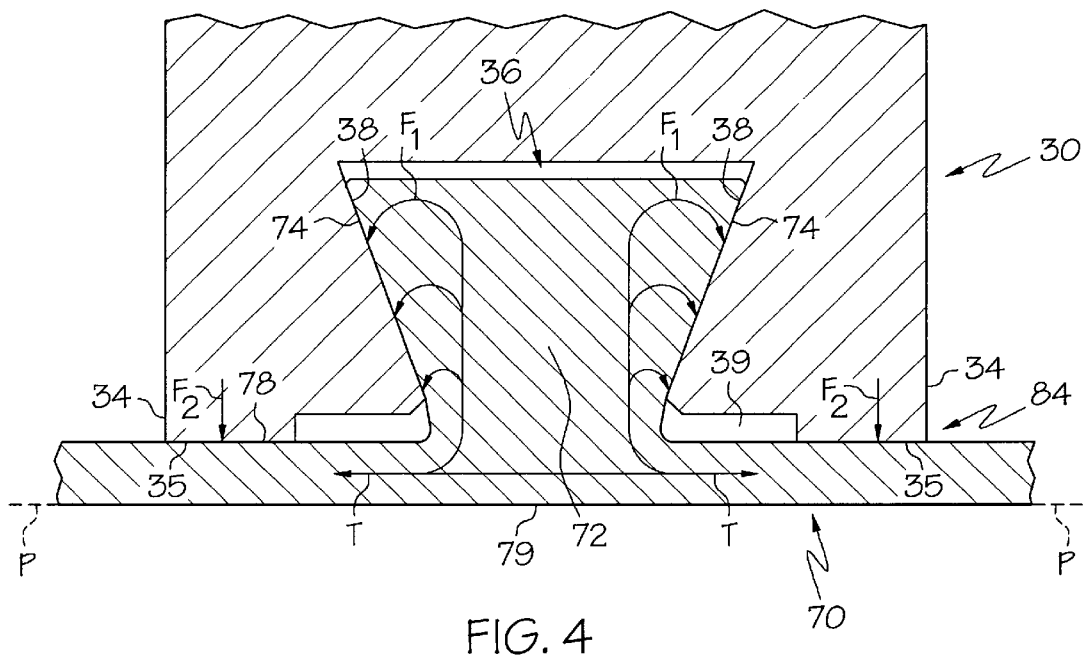
FIG. 4 is a partial sectional view of the holder element interlocked with the belt wherein the belt is tensioned to preload the holder against the outer surface of the belt in accordance with the present invention.

FIGS. 2–4 illustrate more details of the attachment of the holder element 30 to the belt 70. For attachment, the locking member 72 is aligned relative to the slot 36, and then moved laterally to push locking member 72 into the corresponding interlocking slot 36. As shown in FIG. 2, once the locking member 72 is partially located within the slot 36, the top surface 76 of the locking member 72 may abut the outward facing surface 37 of the slot 36. Upon initial attachment (as best seen in FIG. 2), a space 75 may exist between the side surfaces 74 of the locking member 72 and the lateral surface 38 of the interlocking slot 36. In one embodiment, the holder element 30 defines a bottom space 39 that decreases stress concentrations as the belt 70 is displaced in order to allow locking member 72 to be lifted somewhat vertically with respect to the holder element 30 (as seen from space 77 created under belt web 71 under locking member 72).

Once the holder element 30 is located in the correct lateral position relative to the belt 70 (i.e., fully telescoped onto locking member 72), the locking member is seated within the interlocking slot 36 as shown in FIG. 3. At this position, the resiliency of the belt 70 and/or the tension in the belt 70 urges the side surfaces 74 of locking member 72 against the lateral surfaces 38 of the interlocking slot 36, and a space 73 is formed between the top surface 76 of the locking member 72 and the outward facing surface 37 of the interlocking slot 36.

FIG. 4 illustrates a holder element 30 preloaded against the outer surface 78 of the belt 70. Once a tension force (T) is applied to the belt 70, side surfaces 74 of the locking member 72 exerts a force (e.g., F1) against the lateral surfaces 38 of the interlocking slot 36. It will be appreciated that preloading the holder element 30 against the belt 70 increases the frictional contact between the holder element 30 and the belt 70 thereby increasing the strength of the structural connection between the holder element 30 and the belt 70. Preloading also helps increase the deflection resistance of the structural connection by virtue of the downward forces exerted by the locking member 72. Increasing the deflection resistance discourages relative movement between the holder element 30 and the belt 70 which may be desirable for article positioning in many conveyor applications.

In addition, the holder element 30 may be formed with feet 34 that may be symmetrically disposed about the slot 36. Once under tension, the lower surfaces 35 of the feet 34 each exert a force F2 against the outer surface 78 of the belt 70. The feet 34 also help maintain the preloaded holder element 30 in a proper (e.g., vertical) orientation with respect to the outer surface 78 of the belt 70.

The locking member 72 may be formed such that it is at least partially resilient. The resiliency of the locking member 72 allows slight elongation of the locking member 72. As the locking member 72 elongates, the space 77 as shown in FIGS. 2–3 is reduced or eliminated such that the bottom surface 79 of a portion of the belt extends substantially along a single plane (P) as shown in FIG. 4.

As shown in FIG. 2, the locking member 72 may be formed by providing a member having a cross section, along a plane parallel to the longitudinal axis (L) of at least a portion of the outer surface 78 of the belt 70, which is larger at a distal end 69 of the locking member 72 than at the base 68 of the locking member 72. For instance, the locking member 72 may be formed as a generally V-shaped dovetail structure shown in FIGS. 1–4 adapted to interlock with a correspondingly shaped slot 36 of the holder element 30. Other shapes could also be used if the cross section of the locking member 72 is effectively larger at some point above its base 68 in order to provide a selectively interlocking engagement between the holder element 30 and the belt 70, which is simple, reliable, and maintains the holder in a predetermined position relative to the outer surface 78 of the belt 70. For example, the locking member might have a "T" or upside down "L" shape, or be formed in a mushroom shape, ovate shape, or the like.

FIGS. 5–10 illustrate exemplary holder elements which may be used in conjunction with the belt 70. As described above, the conveyor apparatus 100 could incorporate a plurality of identical holder elements 30 for holding a plurality of identical items. Alternatively, one or more different holder elements may be used with the belt 70, either simultaneously or alternatively, to hold and convey different items. For instance, FIG. 5 illustrates a holder element 30 for supporting a generally cylindrical item 32 that is located in a horizontal position extending laterally across the belt 70. In one embodiment, the holder element 30 could be formed with a substantially V-shaped top surface 31, as shown in FIG. 5, to support a horizontally oriented item such as a horizontal cylinder 32. The holder element 30 may be formed as a single holder element or a plurality of holder elements extending laterally across the belt 70 along horizontal axis (H), each holder element engaging a single locking member 72. Alternatively, the holder element(s) may be provided with a plurality of V-shaped top surfaces (not shown) offset along longitudinal axis (L) of the belt 70 for supporting a plurality of laterally extending items 32 spaced along the axis (L) of the belt 70.

FIG. 6 illustrates a specially adapted holder element 40 for supporting items 44 that are positioned in a vertical orientation. The holder element 40 may define one or more receptacles 42, such as sockets or recesses, for receiving one or more objects 44 in a generally vertical orientation. For instance, a plurality of sockets 42 may be arranged in a single row extending laterally relative to the belt 70 along a horizontal axis (H), each engaging locking member 72. Alternatively, the sockets 42 may be formed in a single row extending longitudinally along the axis (L) of the belt 70. The receptacles could alternatively be arranged in a plurality of rows extending both laterally along horizontal axis (H) and longitudinally along longitudinal axis (L) of the belt 70, thereby providing a grid of receptacles for supporting a plurality of items.

FIG. 7 illustrates a holder element 46 including a cleat end portion 48. The cleat may be utilized to provide a stop to locate an item otherwise supported on top of belt 70. For instance, the cleat end portion 48 may support articles as the belt 70 travels up or down an incline and/or the cleat end portion 48 may act as a divider element to separate articles on the conveyor belt 70. Although only one cleat end portion 48 is shown in FIG. 7, it is understood that a plurality of cleat end portions 48 may be arranged in both lateral and/or longitudinal rows relative to the belt 70.

FIG. 8 illustrates a holder element 50 for supporting a horizontal item extending laterally relative to the belt 70, along horizontal axis (H). For instance, the holder element 50 may include or define a seat 52 for receiving and/or engaging an item 54 such as a horizontally oriented bar. The holder element 50 may be formed as a single holder element or a plurality of holder elements extending laterally across the belt 70 along horizontal axis (H), each correspondingly engaging a single item 54. Alternatively, the holder element(s) may be provided with a plurality of seats 52 offset along longitudinal axis (L) of the belt 70 for supporting a plurality of laterally extending items spaced along the longitudinal axis (L) of the belt.

FIG. 9 illustrates a plurality of holder elements 56 for receiving and supporting an oversized item 60. The holder elements 56 may each be formed with one or more seats 58, each seat 58 for supporting a corresponding portion of the oversized horizontal item 60. The horizontal item 60 may be a plate, bar, disk, or any other oversized article. Again, spacing of adjacent holder elements 56 could be accomplished by attaching successive elements 56 to appropriate adjacent locking members 72. In some instances, for example, some locking members might not be utilized, such as where the spacing required use of every other locking member only. Moreover, while FIG. 9 depicts each holder element 56 comprising a single seat 58, each holder element could also comprise a plurality of seats 58 for supporting a corresponding portion of a plurality of items 60. For example, each holder element 56 could include pairs of seats 58 arranged on opposite sides of the holder element, such that each seat supports a corresponding adjacent end portion of a pair of adjacent items 60.

As shown in FIG. 10, a holder element 62 may define one or more slots 64 for supporting one or more thinner items 66 to be vertically oriented, such as sheet material or planar items (e.g., circuit boards). As can be appreciated, the present conveyor belt apparatus is quite adaptive, as any number of different holder elements and/or combinations could be utilized with the same belt.

The shapes and sizes of the holder elements are for illustrative purposes only and may be formed in a plurality of different shapes to hold adapt to the particular item or items to be conveyed. The holder elements may be formed from many different materials, such as rigid, semi-rigid and flexible materials. The flexibility of the belt and locking members also permits the holder element to be formed from an inflexible material or a combination of flexible and inflexible materials. For instance, the holder elements may be formed from hard plastics, aluminum, steel or other materials best suited for the application.

FIGS. 11 and 12 illustrate an exemplary holder element 130 for precise positioning between adjacent items 131 to be conveyed. The holder element 130 is formed with a lower portion 132 and an upper portion 134 that may be adjustable relative to the lower portion 132. The belt 270 may be formed as a timing belt having a web 271 and timing teeth 274 on its lower surface. The belt 270 may also be formed with grooves 276, as shown in FIGS. 11 and 12, to increase the bending flexibility of the belt 270. The locking member 272 is adapted to interlock with a slot 136 in a manner similar to the connection of the locking member 72 of the belt 70 to the slot 36 formed in the holder element 30 as described above. The lower portion 132 and/or the upper portion 134 of the holder element 130 may be formed with one or more fastener receptacles allowing relative movement between the lower portion 132 and the upper portion 134. For example, the lower portion 132 of the holder element 130 may be formed with one or more T-slots 133 for receiving fastening devices. For instance, as best shown in FIG. 12, a fastener such as a bolt 139 extends through an aperture 135 formed in the upper portion 134 of the holder element 130 and into the T-slot 133 of the lower portion 132. The fastener 139 may engage a nut 137 located in the T-slot 133. Once the fastener is tightened, the upper portion 134 is maintained in a position relative to the lower portion 132. The T-slot 133 may be formed such that a space 143 exists between the lower portion 132 and the fastener 139, to permit adjustment of the upper portion 134 relative to the lower portion 132 along the longitudinal axis (L) of the belt 270. The upper portion 134 may be formed with a seat 138 for supporting an item 131. For instance, the seat 138 may be formed with a substantial V-shape similar to the holder element 30 illustrated in FIG. 5. The upper portion 134 may also include an intermediate portion 141, as shown in FIG. 11, extending between and connecting two laterally spaced seats 138. The intermediate portion maintains a constant position between the seats 138.

It will be appreciated that holder element 130 allows precise location of an item 131 (e.g., the cylindrical structure shown in phantom) relative to an adjacent item along the belt. Such spacing may be critical in a manufacturing or assembly operation, for example. As shown in FIG. 12, a gauge 143 may be inserted between one item 131 and another adjacent item. Once the gauge 143 is in position, the upper portion 134 of one of the holder elements 130 may be adjusted in a longitudinal direction (L) along the belt 270 to provide a precise gauging distance between two holder elements 131 as best shown in FIG. 12. Once the proper location is achieved, the fasteners 139 are tightened to fix the position of the upper portion 134 relative to the lower portion 132. The abutting surfaces of the upper portion 134 and the lower portion 132 may also be provided with rough portions, friction enhancing surfaces, serrations (not shown), or the like, in order to increase the frictional contact between the upper portion 134 and the lower portion 132.

As described above, the holder element 30 may be locked to the belt 70 as it travels along a linear direction (M) as shown in FIG. 1. The frictional connection between the holder element 30 and the belt 70 may be sufficient in some applications by itself to adequately connect the holder element 30 to the belt 70. In addition, as shown in FIGS. 13–20, the conveyor may be provided with additional structure such as a guides for orienting the holder element relative to the conveyor bed 102. The guides may be formed as single rails, as shown by guides 110 illustrated in FIG. 20. Alternatively, a plurality of guides 110 and/or discontinuous guides or rails (not shown) may be provided and spaced in a longitudinal orientation relative to the belt in order to save material.

The holder element and the guides in all of the embodiments may comprise a low friction material. The guides and holder element may also be formed from a static resistant material in order to avoid static charge build up on the system. For instance, the guides in the holder elements could be formed from plastic, self-lubricating materials such as polypropylene, polyethylene, acetal, or the like. For example, guides and holder elements could be formed from a DELRIN material commonly available in the industry.

FIGS. 13–19 illustrate partial end sectional views of a conveyor apparatus 100 having guides 110. Only the belt, locking member, holder element and the guides are shown in cross section for clarity.

Figure 13:
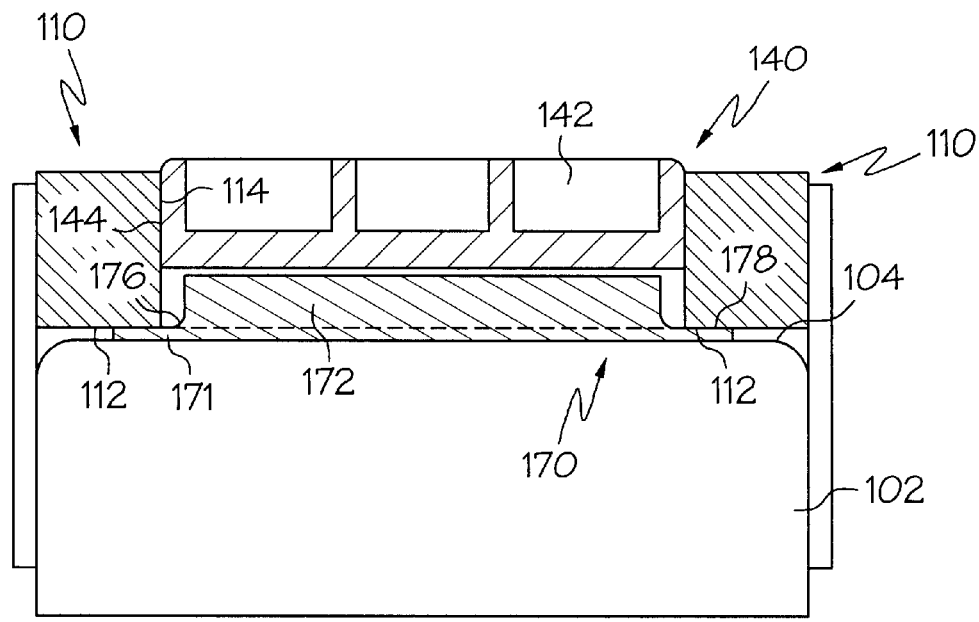
FIG. 13 is a partial end sectional view of a conveyor apparatus of the present invention having guide members that limit lateral movement of the holder element and vertical movement of the belt.

FIG. 13 illustrates one embodiment of an exemplary guide 110 for orienting a holder element 140 defining sockets 142. The guide 110 has a side surface 114 for abutting against an exterior surface 144 of the holder element 140. A small space or clearance (not shown) may exist between the side surface 114 and the exterior surface 144. Such a clearance exists between the guides and the holder element in each embodiment illustrated in FIGS. 13–19. The side surfaces 114 of the guides 110 limit lateral displacement of the holder element 140 relative to the conveyor bed 102. The guides 110 also include a bottom surface 112 for maintaining the belt 170 against the top surface 104 of the conveyor bed 102. The web 171 of the belt 170 includes an outer surface 178 for engaging the bottom surface 112 of the guides 110. Accordingly, the holder element 140, being connected to the belt 170 by the locking member 172, is also maintained at a constant vertical orientation. At least a portion of the web 171 of the belt 170 in contact with the bottom surface 112 of the guides 110 may be provided with an optional layer of friction resistant material 174, best shown in FIG. 20, to minimize friction and prevent damage and/or wear to the belt 170. Such material 174 might be added as a continuous or intermittent strip of DELRIN material, or via an anti-friction coating on selected portions of the belt.

Figure 14:
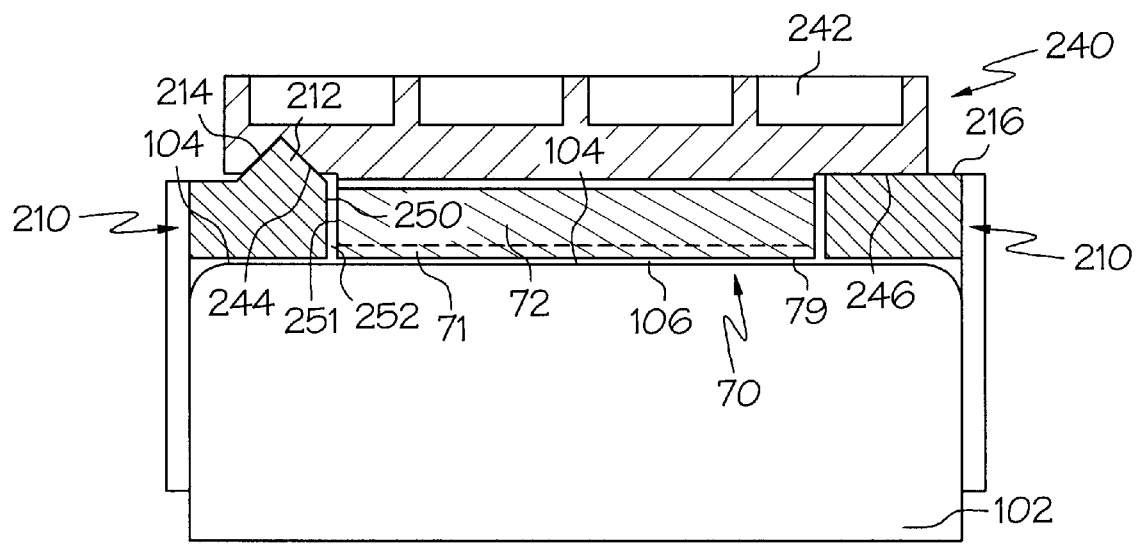
FIG. 14 is a partial end sectional view of a conveyor apparatus of the present invention having guide members including at least one protrusion for interacting with a groove formed in the holder element for precise lateral positioning of the holder element relative to the conveyor bed and to prevent the belt from contacting the conveyor bed.

FIG. 14 illustrates another holder element 240 defining sockets 242 wherein the holder element 240 is attached to the belt 70 by a locking member 72. The guides 210 are adapted to precisely locate the holder element 240 laterally relative to the conveyor bed 102. The guides 210 may include one or more protrusions 212. For instance, the protrusions 212 could be in the form of a cornered protrusion 212 as shown in FIG. 14. The belt 70 may bias the holder element 240 in a downward direction such that an upper surface 214 of the protrusion 212 engages or is received in a groove 244 formed in the holder element 240, thereby seating the holder element 240 in a predetermined lateral orientation with respect to the conveyor bed 102. As shown in FIG. 14, for example, a triangular corner-shaped protrusion 212 precisely locates the lateral position of the holder element 240.

Each of the guides 210 may include a small space or clearance. For example, a small space or clearance 252 may be formed between the interior surface 250 of the guide 210 and the exterior surface 251 of the holder element 240 and/or the belt 270.

As further shown in FIG. 14, one of the guides 210 may also include a flat top surface 216 that abuts against a lower surface 246 of the holder element 240. Alternatively, both of the guides may each have a protrusion 212 such that protrusions extend upwardly on both sides of the conveyor apparatus. Although the protrusions are shown as cornered in FIG. 14, the protrusions could also be formed in other shapes such as semi-circular, arcuate, a plurality of teeth, or other shapes. In addition, the protrusions could alternatively be formed in the holder element 240 for seating in a groove or slot defined in the guides 210.

The guide 210 as illustrated in FIG. 14 also at least substantially prevents the belt 70 from engaging the top surface 104 of the conveyor bed 102 such that a gap 106 exists between the belt 70 and the top surface 104 of the conveyor bed 102. The gap 106 helps prevent the belt 70 from wearing out by discouraging contact between the bottom surface 79 of the belt 70 and the top surface 104 of the conveyor bed 102. Thus, the highest point of wear in the conveyor system would concern the guides 210 and the holder element 240 that are less expensive to replace than a specialized belt 70 having the locking members 72.

Figure 15:
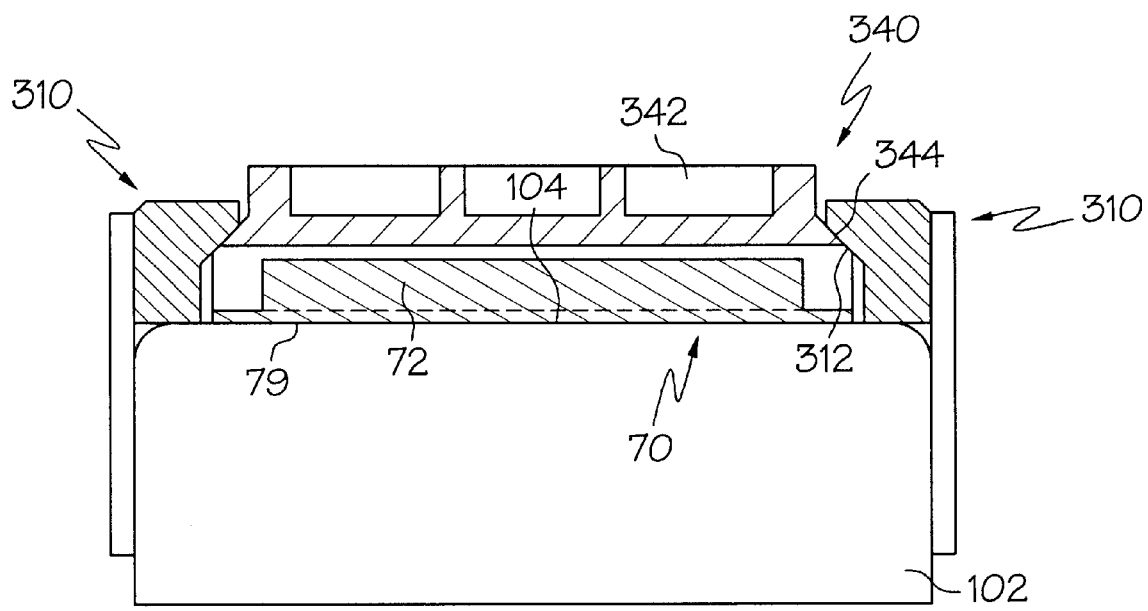
FIG. 15 is a partial end sectional view of a conveyor apparatus of the present invention having guides with an angled surface for limiting and controlling lateral and vertical movement of the holder element.

FIG. 15 illustrates another embodiment including guides 310 having a holder element 340 defining sockets 342 for interlocking with a locking member 72 of belt 70. The guides 310 each may have an inwardly beveled surface 312 for abutting against a side surface 344 of holder element 340. The angled side surface 344 of the holder element 340 and the correspondingly beveled surface 312 of the guides 310 limit and control lateral and vertical displacement of the holder element 340 relative to the conveyor bed 102. The guides 310 also bias and maintain the bottom surface 79 of the belt 70 against the top surface 104 of the conveyor bed 102.

Figure 16:
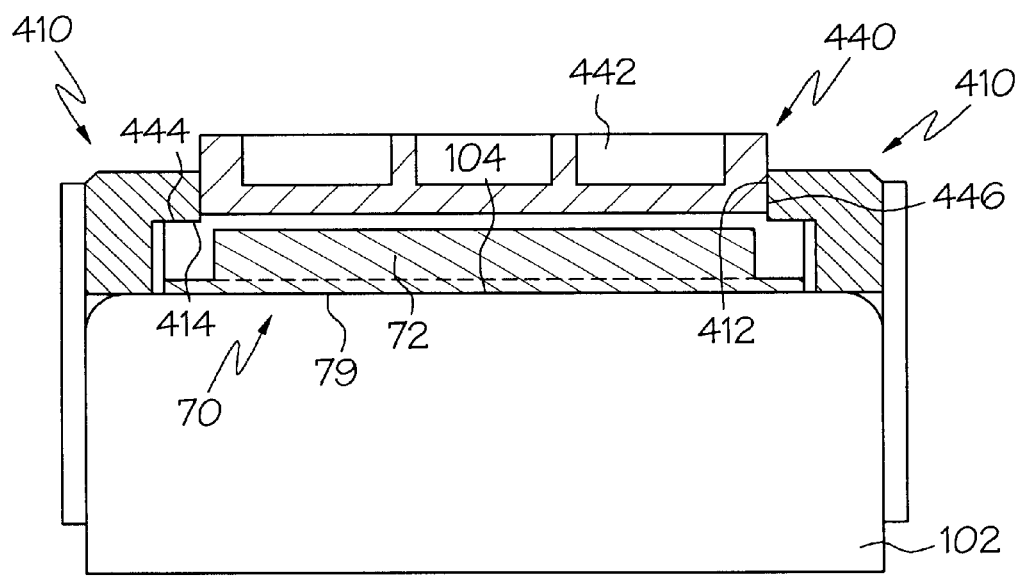
FIG. 16 is a partial end sectional view of a conveyor apparatus of the present invention having guides for limiting and controlling vertical and lateral movement of the holder element.

FIG. 16 illustrates yet another exemplary embodiment for orienting a holder element 440 defining sockets 442. The holder element 440 is interlocked with a locking member 72 provided on a belt 70 as described above. The guides 410 limit and control both lateral and vertical movement of the holder element 440 relative to the conveyor bed 102. The guides 410 each have a side surface 412 for abutting against a corresponding lateral surface 446 of the holder element 440. Each of the guides 410 also include a bottom surface 414 for engaging a corresponding upper surface 444 of the holder element 440. The guides 410 also maintain a bottom surface 79 of the belt 70 against the top surface 104 of the conveyor bed 102.

Figure 17:
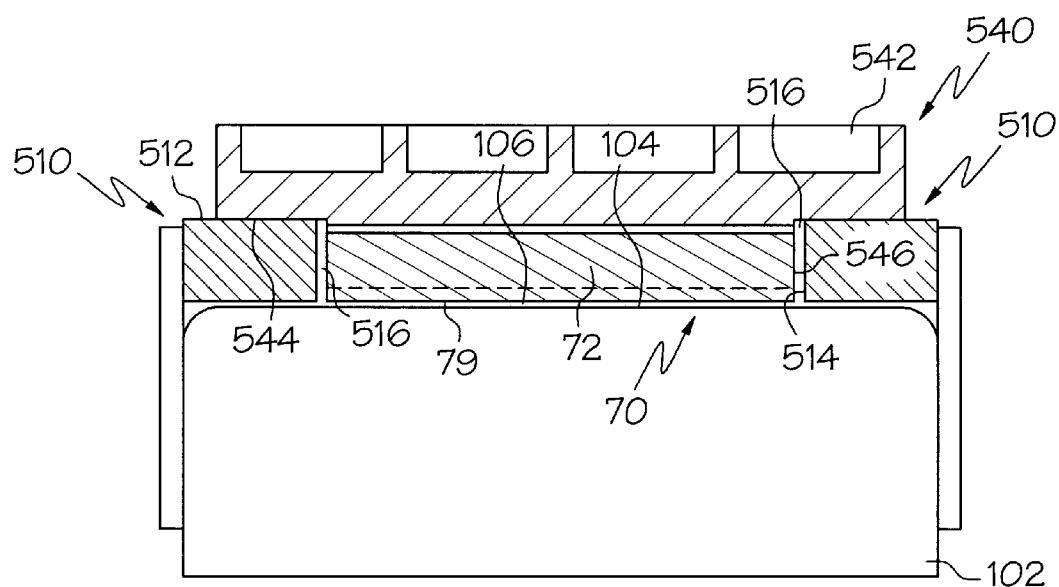
FIG. 17 is a partial end sectional view of a conveyer apparatus having guides for preventing the belt from contacting the conveyor bed and for limiting the lateral movement of the holder element.

FIG. 17 illustrates another exemplary embodiment for a holder element 540 defining sockets 542 or other receptacles or supports. The holder element 540 is interlocked with locking member 72 provided on belt 70 as discussed above. The 0des 510 reduce wear on the belt 70 by preventing the belt 70 from contacting the top surface 104 of the conveyor bed 102 such that a space 106 exists between the bottom surface 79 of the belt 70 and the top surface 104 of the conveyor bed 102. Tension in the belt 70 biases holder element 540 toward its lower-most position such that a bottom surface 544 of the holder element 540 abuts a top surface 512 of the guides 510. A space 516 may be provided between the guides 510 and the holder element 540 to allow limited lateral movement of the holder element 540 relative to the conveyor bed 102. As will be understood, sufficient lateral force on a holder element 540 will cause the bottom surface 544 of the holder element 540 to slide against the top surfaces 512 of the guides 510 until a lateral surface 546 of the holder element 540 abuts against a side surface 514 of one of the guides 510, thereby limiting further movement.

Figure 18:
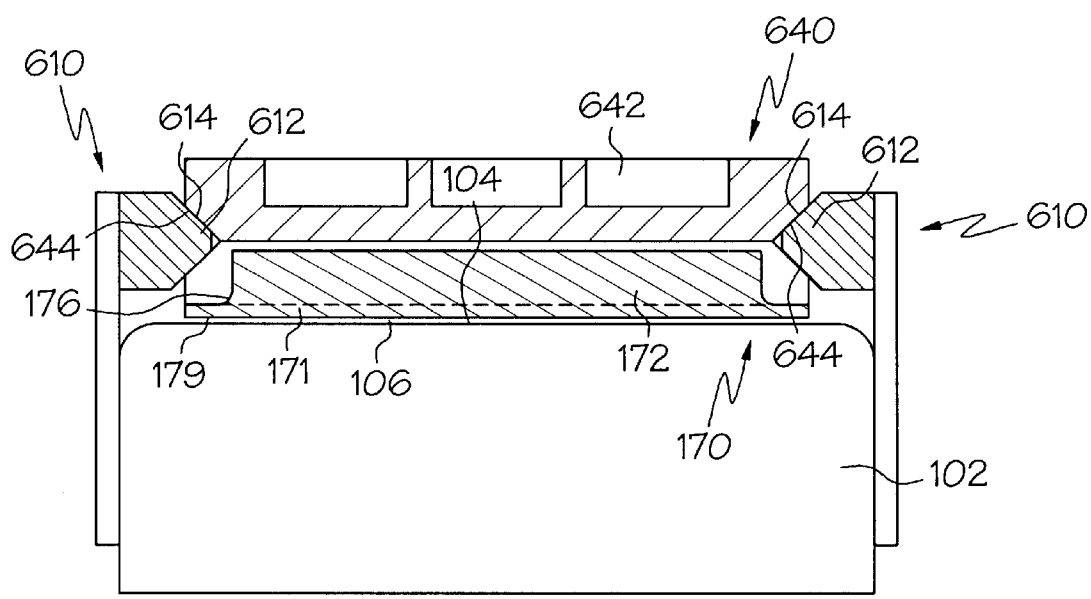
FIG. 18 is a partial end sectional view of a conveyor apparatus of the present invention including guides with a protrusion for interacting with a groove formed in the holder element for limiting lateral and vertical movement of the holder element and to prevent the belt from contacting the conveyor bed.

FIG. 18 illustrates still another exemplary holder element 640 defining (for example) sockets 642 for supporting items to be conveyed. The holder element 640 is interlocked with locking member 172 provided on the belt 170 as described herein. The guides 610 limit and control both lateral and vertical displacement of the holder element 640 relative to conveyor bed 102, and also reduce wear on the belt 170 by helping to maintain the belt 170 in a vertical location such that a space 106 exists between the bottom surface 179 of the belt 170 and the top surface 104 of conveyor bed 102. In particular, each of the guides 610 include a protrusion 612 having surfaces 614 which abut against a groove 644 defined in holder element 640. Alternatively, the protrusions could be formed in the holder element 640 for seating in corresponding grooves defined in the guides 610.

Figure 19:
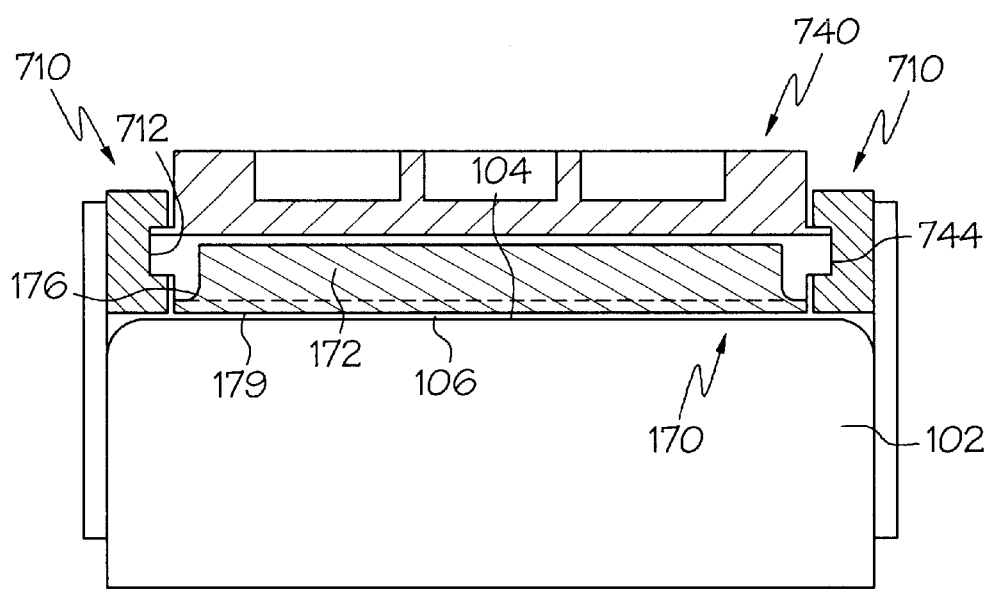
FIG. 19 is a partial end sectional view of a conveyor apparatus of the present invention having guides including a channel receiving a protrusion extending from the holder element for limiting vertical and lateral movement of the holder element and to prevent the belt from contacting the conveyor bed.

FIG. 19 illustrates another exemplary holder element 740 interlocked with the locking member 172 of belt 170. The guides 710 are designed to reduce wear on the belt 170 by helping to maintain the belt 170 in a vertical orientation such that a space 106 exists between the bottom surface 179 of the belt 170 and the top surface 104 of conveyor bed 102. Each of the guides 710 include a groove, channel or other receiving area 712 that receives a corresponding protrusion 744 formed in each of the holder elements 740, thereby limiting and controlling both lateral and vertical displacement of the holder element 740 relative to the conveyor bed 102. Alternatively, the holder element 740 could include the groove or channel for receiving a corresponding protrusion formed in each of the guides 710.

The embodiments of FIGS. 13–19 each illustrate a conveyor apparatus having guides for orienting a holder element as described above. The holder element in each of the embodiments is further described and/or illustrated as having receptacles such as sockets. Alternatively, the holder elements of FIGS. 13–19 could be formed with other shapes depending on the items to be conveyed (e.g., the holder elements of FIGS. 5–12).

As shown in FIGS. 13, 15, 16, 18, and 19, the belt may comprise a locking member 172 that does not extend entirely across the lateral width of the web portion 171 of the belt. Such a locking member could be discontinuous, or could be a unitary structure that does not extend across the entire lateral surface of the belt.

The connection between the locking member 172 and the web portion 171 of the belt 170 may optionally be provided with a rounded portion 176, as shown in FIGS. 13, 18 and 19, to reduce stress concentrations.

Any of the holder elements described above are capable of being used with the belt 170. Moreover, any of the previously described embodiments, with the exception of the conveyor apparatus illustrated in FIG. 13, may be used with a belt 70 wherein the locking member 72 extends across the entire width of the web 71 of the belt 70. FIG. 13 requires a locking member 172 that does not extend entirely across the lateral width of the web portion 171 of the belt 170 to allow the guides 110 to contact an outer surface 178 of the belt 170 as shown in FIG. 13.

Figure 20:
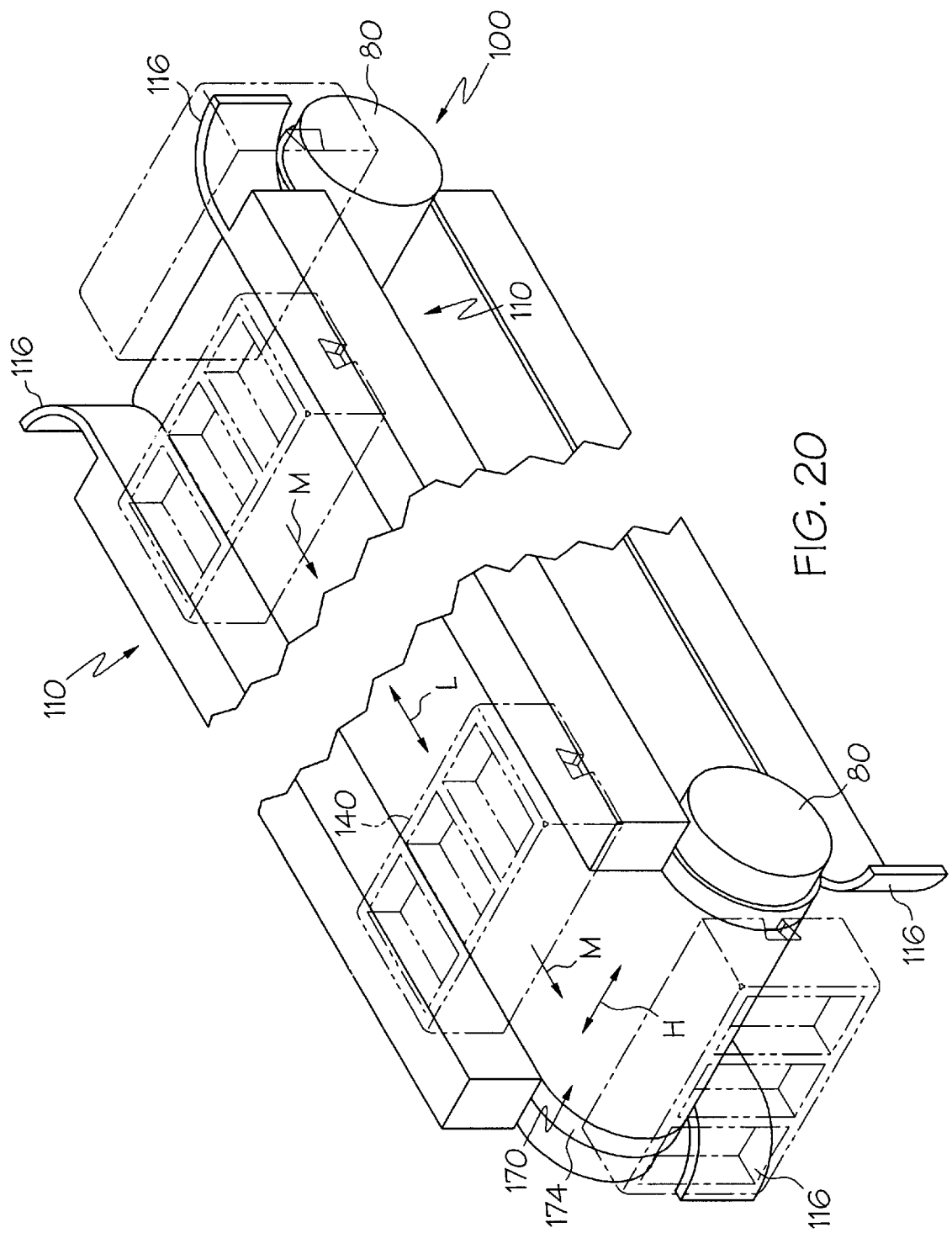
FIG. 20 is a partial perspective view of a conveyor apparatus of the present invention having elongated guiderails wherein at least one end portion of the guiderails have a beveled end.

FIG. 20 is a broken/partial perspective view of portions of a conveyor apparatus of the present invention provided with guides 810 for preventing vertical and lateral displacement of the holder element 140 relative to conveyor bed 102. As described previously, the holder elements are preloaded against the belt when traveling along the linear path (M) such that the holder element is in a locked position indicated at 84 as shown in FIG. 1. However, the preload on the holder element is at least partially decreased as it travels in an arcuate path (A) about the pulley 80 as indicated by an at least partially unlocked position 86. At the at least partially unlocked position 86, in this embodiment as well as the other embodiments described above, the holder element may still frictionally engage the locking member of the belt. However, a sufficient lateral force may overcome the fictional engagement, causing lateral movement of the holder element relative to the belt. As shown in FIG. 20, at least one end of the guides 110 may have beveled or chamfered ends 116 such that any lateral displacement of the holder element as it travels in the arcuate path (A) about the pulley 80 will be corrected as side portions of the holder element 140 engage the beveled or chamfered ends 116 thereby realigning the holder element relative to the conveyor bed 102 before entering back into the locked position 84. Although only one end is shown beveled or chamfered in FIG. 20, it is understood that both ends could be beveled or chamfered. Beveling or chamfering both ends would be desirable in applications where the conveyor belt can transport objects in both directions along the longitudinal axis (L) of the belt. It will be appreciated that any misalignment of the holder element will be corrected as it travels across the arcuate path (A). Thus, one full rotation of the belt will correct the holder elements lateral position twice as it travels about both pulleys as shown in FIG. 20.

The guide arrangements having beveled or chamfered end portions are described above and illustrated in FIG. 20 with guides 110. In addition, any of the guides described above may also have beveled end portions to realign the holder elements.

All of the guides described above remain stationary with respect to the conveyor bed 102. Other nonstationary devices can also be used in addition to the guides or as a substitute for the guides. For instance, end plates (not shown) may each be mounted on corresponding sides of the holder elements, over the slot openings, to prevent the holder element from laterally disengaging the locking member of the belt. The end plates may also be used in combination with the guides to prevent disengagement when the holder element travels about the arcuate path (A). When used in combination with the guides, the end plates may be formed from a friction resistant material similar to the guides for reducing wear and friction. Since the end plates would be positioned between the holder element and the guides, the frictional properties of the holder element may not be a design concern.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art without departing from the scope of the present invention. Similarly, specific structures, assemblies, arrangements or functions described herein are not essential or critical to the invention unless specifically identified as such, and can be interchanged, modified or varied according to the application at hand. Accordingly, this invention is intended to embrace all alternatives, modifications and variations that have been discussed herein, and others that fall within the spirit and broad scope of the claims.

What is claimed is:

1. An endless conveyor belt apparatus for conveyor applications including end pulleys around which the belt must rotate, the belt apparatus comprising:

a) an endless belt including a belt outer surface, wherein at least a portion of such outer surface extends along a longitudinal axis;

b) at least one locking member extending away from the longitudinal axis, the locking member including a base attached to the outer surface and at least one locking surface located above the base; and c) at least one holder element removably interlocked with the locking surface of a corresponding locking member, wherein the locking surface is configured to provide downward force on the holder element to preload the holder element against the outer surface of the belt upon application of tension to the belt in use.

2. The conveyor belt apparatus of claim 1, wherein the holder element defines a slot and wherein the locking member further comprises a guide forming the locking surface, the guide adapted to be at least partially received in the slot of the corresponding holder element.

3. The conveyor belt apparatus of claim 2, wherein the holder element includes feet symmetrically disposed about the slot and wherein the locking surface is configured to provide downward force on the holder element to seat the feet of the holder against the outer surface of the belt upon application of tension to the belt in use, thereby stabilizing the holder element in a desired orientation relative to the belt.

4. The conveyor belt apparatus of claim 2, wherein the guide is formed as a generally V-shaped dovetail structure adapted to interlock with the slot of the corresponding holder element.

5. The conveyor belt apparatus of claim 4, wherein the dovetail structure is adapted to elongate when the belt is put under tension in use.

6. The conveyor belt apparatus of claim 1, wherein the preload of the holder element against the outer surface of the belt can be adjusted by changing tension in the belt.

7. The conveyor belt apparatus of claim 1, wherein the belt is adapted to travel along a linear path along the longitudinal axis and along an arcuate path about a central axis of a pulley, and wherein said preload is at least partially decreased when traveling from the linear path to the arcuate path and increased when traveling from the arcuate path to the linear path.

8. The conveyor belt apparatus of claim 1, wherein the locking member comprises a cross section along a plane parallel to the longitudinal axis which is larger at a position above its base.

9. The conveyor belt apparatus of claim 8, wherein the locking member further comprises a guide forming the locking surface, wherein the guide is provided in the form of a generally V-shaped dovetail structure received in a slot formed in the corresponding holder element.

10. The conveyor belt apparatus of claim 1, further comprising a plurality of separate holder elements and a plurality of locking members spaced along the longitudinal axis, and wherein each of the holder elements can be selectively interlocked with a corresponding one of the locking members as desired.

11. The conveyor belt apparatus of claim 10, wherein said plurality of separate holder elements comprises holder elements of different shapes to accommodate different items.

12. The conveyor belt apparatus of claim 1, wherein the endless belt is formed as one continuous loop and includes bending flexibility at substantially every point along its longitudinal axis such that the belt is adapted to form around at least portions of the end pulleys.

13. The conveyor belt apparatus of claim 1, wherein the locking member is at least partially resilient.

14. The conveyor belt apparatus of claim 1, wherein the holder element comprises at least one lower portion removably interlocked with the locking surface of the corresponding locking member, and at least one upper portion adjustably positioned relative to the lower portion.

15. The conveyor belt apparatus of claim 14, wherein the upper portion is capable of being adjustably positioned along the longitudinal axis.

16. The conveyor belt apparatus of claim 14, wherein the at least one lower portion comprises a first lower portion and a second lower portion spaced from the first lower portion, and the at least one upper portion comprises one upper portion extending between the first lower portion and the second lower portion.

17. A conveyor apparatus comprising:
a) at least two spaced end pulleys; and
b) an endless conveyor belt for rotating around the end pulleys comprising a belt outer surface including a longitudinal axis, at least one locking member extending from the longitudinal axis, the locking member including a base attached to the outer surface and at least one locking surface located above the base, at least one holder element removably interlocked with the locking surface of a corresponding locking member, said holder element defining a slot for at least partially receiving the locking surface in use to effectively interlock the holder element on a corresponding locking member, wherein the locking surface is configured to provide downward force on the holder element to preload the holder element against the outer surface of the belt upon application of tension to the belt in use.

18. The conveyor apparatus of claim 17, further comprising a belt tensioning mechanism.

19. The conveyor apparatus of claim 17, wherein the belt is adapted to travel along a linear path along its longitudinal axis and along an arcuate path about a central axis of a pulley, and wherein the preload is at least partially decreased when traveling from the linear path to the arcuate path and increased when traveling from the arcuate path to the linear path.

20. The conveyor apparatus of claim 19, further comprising at least one restraining member adapted to prevent the holder from being removed from the locking member at least when the holder is traveling along the linear path.

21. The conveyor apparatus of claim 20, wherein the restraining member comprises at least two elongated guide members spaced from one another and at least extending along a path substantially parallel to the longitudinal axis.

22. The conveyor apparatus of claim 20, wherein the restraining member prevents the holder from being removed from the locking member when the holder is traveling along the linear path but allows the holder to be removed from the locking member when traveling along at least a portion of the arcuate path.

23. The conveyor apparatus of claim 20, wherein the restraining member comprises at least one beveled end portion adapted to realign the holder as the holder travels from the arcuate path to the linear path.

24. A method of providing an improved conveyor belt system comprising the steps of:
a) providing at least two spaced pulleys;
b) providing an endless belt comprising an outer surface including a longitudinal axis, the endless belt further comprising at least one locking member extending away from the longitudinal axis, and including a base attached to the outer surface and at least one locking surface located above the attached base;
c) mounting the endless belt on the pulleys;
d) providing at least one holder element; and
e) interlocking the holder element with the locking surface of a corresponding locking member, wherein the locking surface is configured to provide downward force on the holder element to preload the holder element against the outer surface of the belt upon application of tension to the belt in use.

25. The method of claim 24 comprising the further step of tensioning the belt to preload the holder element against the outer surface of the belt.

26. The method of claim 25 comprising the further step of adjusting the tension of the belt to adjust the preload of the holder element against the outer surface of the belt.

27. The method of claim 24 comprising the further steps of removing the at least one holder element and interlocking another holder element with the locking surface of the corresponding locking member.

* * * * *